United States Patent [19]
Viani et al.

[11] Patent Number: 6,016,693
[45] Date of Patent: Jan. 25, 2000

[54] MICROFABRICATION OF CANTILEVERS USING SACRIFICIAL TEMPLATES

[75] Inventors: Mario B. Viani, Santa Barbara; Paul Hansma; Ami Chand, both of Goleta; Mark A. Wendman; Hal J. Morrett, both of Goleta, all of Calif.

[73] Assignee: The Regents of the University of California, Oakland, Calif.

[21] Appl. No.: 09/020,816

[22] Filed: Feb. 9, 1998

[51] Int. Cl.$^7$ ....................................................... G01B 7/34
[52] U.S. Cl. ............................................................. 73/105
[58] Field of Search ............................... 73/105; 250/306, 250/307

[56] References Cited

U.S. PATENT DOCUMENTS

| | | | |
|---|---|---|---|
| 5,276,672 | 1/1994 | Miyazaki et al. ...................... | 73/105 X |
| 5,606,162 | 2/1997 | Buser et al. ........................... | 73/105 X |
| 5,753,912 | 5/1998 | Matsuyama ........................... | 73/105 X |

OTHER PUBLICATIONS

M. Farooqui et al., "Micromachined Silicon Sensors for Atomic Force Microscopy", Nanotechnology, vol. 3, 1992, pp. 91–97.

T. Schaffer et al., "An Atomic Force Microscope for Small Cantilevers", SPIE Proceedings, Micromachining and Imaging, vol. 3009, Feb. 13, 1997, pp. 48–52.

T.R. Albrecht, S. Akamine, T.E. Carver, and C.F. Quate, Microfabrication Cantilever Styli for the Atomic Force Microscope, J. Vac. Sci. Technol., A84, 3386, Jul./Aug. 1990.

O. Wolter, Th. Bayer, and J. Greschner, "Micromachined Silicon Sensors for Scanning Force Microscopy", J. Vac. Sci. Technol. B9(2), 1353, Mar./Apr. 1991.

H.J. Mamin, L.S. Fan, S. Hoen, D. Rugar, "Tip–based data storage using micromechanical cantilevers", Sensors and Actuators, A48, 215–219, 1995.

Jan. P. Rasmussen, Peter T. Tang, Curt Sander, Ole Hansen and Per Moller, "Fabrication of an All–Metal Atomic Force Microscope Probe", Proceedings of Transducers 97, Chicago, Jun. 16–19, 1997, p. 463.

Kirsten Ingolf Schiffmann, "Investigation of fabrication parameters for the electon–beam–induced deposition of contamination tips used in atomic force microscopy", Nanotechnology, 4, 163–169, 1993.

Rudiger Berger, Emmanuel Delamarche, Hans Peter Lang, Christoph Gerber, James K. Gimzewski, Ernst Meyer, Hans–Joachim Guntherodt, "Surface Stress in the Self–Assembly of Alkanethiols on Gold", Science, vol. 276, 2021, Jun. 1997.

D.A. Walters, J.P. Cleveland, N.H. Thomson, P.K. Hansma, M.A. Wendman, G. Gurley, and V. Elings, "Short Cantilevers for Atomic Force Microscopy", Rev. Sci. Instrum. 67, 3583–3590 (1996).

D.A. Walters, M.B. Viani, G.T. Paloczi, T.E. Schaffer, J.P. Cleveland, M. Wendman, G. Gurley, V. Elings and P.K. Hansma, "Atomic Force Microscopy Using Small Cantilevers", SPIE, Proceedings Micro–Machining and Imaging 3009, 48 (1997).

Milan Mrksich and George M. Whitesides, "Patterning self–assembled monolayers using microcontact printing: a new technology for biosensors?" Tibtech, vol. 23, 228, Jun. 1995.

(List continued on next page.)

*Primary Examiner*—Daniel S. Larkin
*Attorney, Agent, or Firm*—Fulbright & Jaworski

[57] ABSTRACT

A sacrificial cantilever is used as a template for making cantilevers of non-standard materials for use in an atomic force microscope. The desired metal is deposited onto the sacrificial cantilever, followed by removal of the sacrificial cantilever.

20 Claims, 7 Drawing Sheets

OTHER PUBLICATIONS

S.R.Manalis, S.C. Minne, C.F.Quate, "Atomic force microscopy for high speed imaging using cantilevers with an integrated actuator and sensor," *Applied Physics Letters,* vol. 68 (No. 6) 872–873, Feb. 1996.

Ami Chand et al., "Electrochemical etch–stop technique using diffused p–n junction for silicon micromechanical structures," VIII Internation Aowrkshop on Physics of Semiconductor Devices, NPL, New Delhi (India) Dec. 11–16, 1995, pp. 484–487.

Sudhir Chandra, et al "Design and Development of microstructures for MEMS applications," SPIE's 1997 Symposium on Micromachining an Microfabrication, Sep. 29–30, 1997, Austin, Texas, USA.

Sudhir Chandra et al. "Development of P+ Silicon Electrostatic Microactuator Using Direct Wafer Bonding Technology", 7th International Symposium on IC Technology Systems and Applications (ISIC–97), sponsored by IEEE, Nanyang Technological University, Singapore Sep. 10–12, 1997.

Ami Chand et al. "Realization of oxide cantilever beams using silicon micromachining technology" 2nd National Seminar on Physics and Technology of sensors, PU, Pune (India) Feb. 2–4, 1995, p. C36–1.

C.B.Prater et al. "Improved Scanning Ion–Conductance Microscopy Using Microfabricated Probes" *Rev. Sci. Instrum.* 62, 2634 (1991).

J.P.Cleveland et al "A nondestructive Method for Determining the Spring Constant of Cantilevers for the Scanning Force Microscopy" *Rev. Sci. Instrum.* vol. 64, No. 02, 403–405 (1993).

D. A. Walters, et cl. "Atomic Force Microscopy Integrated with a Scanning Electron Microscope for Tip Fabrication" *App. Phys. Lett.* vol. 65, No. 6, 787 (1994).

M. Radmacher, et al. "Scanning Nearfield Optical Microscope using Microfabricated Probes", *Rev. Sci. Instrum.* 65, 2737 (1994).

M. Radmacher et al., "Improvement of Thermally Induced Bending of Cantilevers used for Atomic Force Microscopy" *Scanning* vol. 17, No. 2, 117 (1995).

E. Betzig et al., "Fiber laser probe for near–field scanning optical microscopy" *App. Phys. Lett.* Dec. 27, 1994, vol. 63, (No. 26) 3550–2.

T.E.Schaffer, J.P.Cleveland, F.Ohnesorge,D.A.Walters, and P.K.Hansma, Studies of vibrating atomic force microscopy canilevers in liquid, J.App.Phys.80(7), Oct. 1, 1996, pp. 3622–3627.

Minne, Stephen Charles, Increasing the Throughput of Atomic Force Microscopy, A dissertation submitted to the Department of Electrical Engineering and the Committee on Graduate Studies of Stanford University, UMI Microform 9702945, 1996.

MICROFABRICATION OF CANTILEVERS USING SACRIFICIAL TEMPLATES

This invention was made with Government support under Grant No. DMR-9622169, awarded by the National Science Foundation. The Government has certain rights in this invention.

BACKGROUND OF THE INVENTION

Since its invention by Bimning, Quate, & Gerber in 1986, Atomic Force Microscopy (AFM) has proven to be an excellent tool for imaging a wide class of systems such as semiconductors, minerals, polymers, and biomaterials. The AFM obtains near atomic resolution by probing surfaces with micromachined cantilevers that have integrated tips. In contrast to the hand-cut aluminum foil cantilevers of the earliest AFMs, the current processes for fabricating cantilevers out of silicon or silicon nitride yield devices that are well defined and have reproducible spring constants and resonant frequencies. However, the dimensions of these devices are usually on the order of a hundred microns or more and are a limiting factor in the imaging rate and noise floor of the AFM. See: T. R. Albrecht, S. Akamine, T. E. Carver, and C. F. Quate, Microfabrication of Cantilever Styli for the Atomic Force Microscope", J. Vac. Sci. Technol., A84, 3386, July/August 1990; and O. Wolter, Th. Bayer, and J. Greschner, "Micromachined Silicon Sensors for Scanning Force Microscopy", J. Vac. Sci. Technol. B9(2), 1353, March/April 1991.

Some cantilevers have been made substantially smaller. For example, a 23-micron cantilever has been described in D. A. Walters, J. P. Cleveland, N. H. Thomson, P. K. Hansma, M. A. Wendman, G. Gurley, and V. Elings, "Short Cantilevers for Atomic Force Microscopy", Rev. Sci. Instrum. 67, 3583–3590 (1996). A 26 micron cantilever as described by D. A. Walters, M. B. Viani, G. T. Paloczi, T. E. Schaffer, J. P. Cleveland, M. Wendman, G. Gurley, V. Elings and P. K. Hansma, "Atomic Force Microscopy Using Small Cantilevers", SPIE, Proceedings Micro-Machining and Imaging 3009, 48 (1997). More recently, aluminum cantilevers as small as 9 microns have been constructed; see T. E. Schaffer, M. B. VIANI, D. A. Walters, B. Drake, E. K. Runge, J. P. Cleveland, M. Wendman, and P. K. Hansma, "An Atomic Force Microscope for Small Cantilevers", SPIE, Proceedings Micro-Machining and Imaging 3009, 48 (1997).

Various methods are known for forming tips on such cantilevers; see: H. J. Mamin, L. S. Fan, S. Hoen, D. Rugar, "Tip-based data storage using micromechanical cantilevers", Sensors and Actuators, A48, 215–219, 1995; Jan. P. Rasmussen, Peter T. Tang, Curt Sander, Ole Hansen and Per Moller, "Fabrication of an All-Metal Atomic Force Microscope Probe", Proceedings of Transducers 97, Chicago, Jun. 16–19, 1997, pg. 463; and Kirsten Ingolf Schiffmann, "Investigation of fabrication parameters for the electron-beam-induced deposition of contamination tips used in atomic force microscopy", Nanotechnology, 4, 163–169, 1993.

It is also known to deposit metal on one side of the cantilever; see Rüdiger Berger, Emmanuel Delamarche, Hans Peter Lang, Christoph Gerber, James K. Gimzewski, Ernst Meyer, Hans-Joachim Güntherodt, "Surface Stress in the Self-Assembly of Alkanethiols on Gold", Science, Vol. 276, 2021, June 1997. Such a structure can have adverse properties due to bending effects as the temperature changes.

Cantilevers with dimensions on the scale of microns promise low spring constants (<0.1 N/m) and high resonant frequencies (>1 MHz). For example, a silicon cantilever which is 5 $\mu$m long, 2 $\mu$m wide, and 50 nm thick will have a calculated resonant frequency of 2.8 MHz and a spring Constance of 0.1 N/m. In contrast, the relatively large commercially available cantilevers with comparable spring constants have resonant frequencies substantially less than 100 KHz. There are several advantages to increasing the resonant frequency while maintaining the low spring constants necessary for imaging soft samples. First, higher resonant frequencies will allow for faster imaging rates. Second, cantilevers with higher resonant frequencies will have lower noise in a given bandwidth by spreading the thermal noise over a greater frequency range. Third, small cantilevers should be less affected by viscous damping, therefore, allowing increased force sensitivity.

BRIEF SUMMARY OF THE INVENTION

In accordance with the present invention, we provide a novel process for fabricating small metallic cantilevers. The process is compatible with standard bulk micromachining technology and allows flexibility for various metals to be used. The process has been implemented to fabricate cantilevers out of silver and 14-carat gold having lengths of 4–10 $\mu$m, widths of 2–4 $\mu$m, and thicknesses of 50–70 nm.

The process utilizes a sacrificial cantilever as a template for making cantilevers of non-standard materials such as metals or other material that is difficult to micromachine. First, a sacrificial cantilever is fabricated out of silicon dioxide ($SiO_2$), or some other desired material. Next, the material which will form the final cantilever is deposited onto the sacrificial cantilever and the sacrificial cantilever is then selectively etched away. The final cantilever material can be a metal, alloy, or some other material that has the desired properties such as chemical etch resistance, optical reflectivity, mechanical properties, and/or low film stress. In a particular embodiment, a shaped cantilever is formed. In other particular embodiments, methods are provided to relieve stress between metal cantilever material and the material of the sacrificial cantilever.

One of the advantages of the process of this invention is that non-standard processing materials can be kept out of the process until the very last step. The invention makes it possible to fabricate small metallic cantilevers having dimensions with lengths of 2–10 $\mu$m, widths of 2–4 $\mu$m, and thicknesses of 70–100 nm. Small metal cantilevers are important because they enable faster and/or lower noise operation of the AFM. Furthermore, it is possible to use the techniques of the invention to fabricate non-planar cantilevers which may offer certain advantages over planar cantilevers.

BRIEF DESCRIPTION OF THE DRAWINGS

The invention may be better understood with reference to the accompanying drawings wherein.

DETAILED DESCRIPTION OF THE INVENTION

Cantilevers with low spring constants (<0.1 N/m) are useful for imaging with small forces and therefore allow for non-destructive imaging of delicate samples. However, as seen from the equipartition theorem, cantilevers with lower spring constants have the disadvantage of being increasingly affected by Brownian motion. Ultimately, this thermal motion sets the resolution of the AFM.

Figure 1:
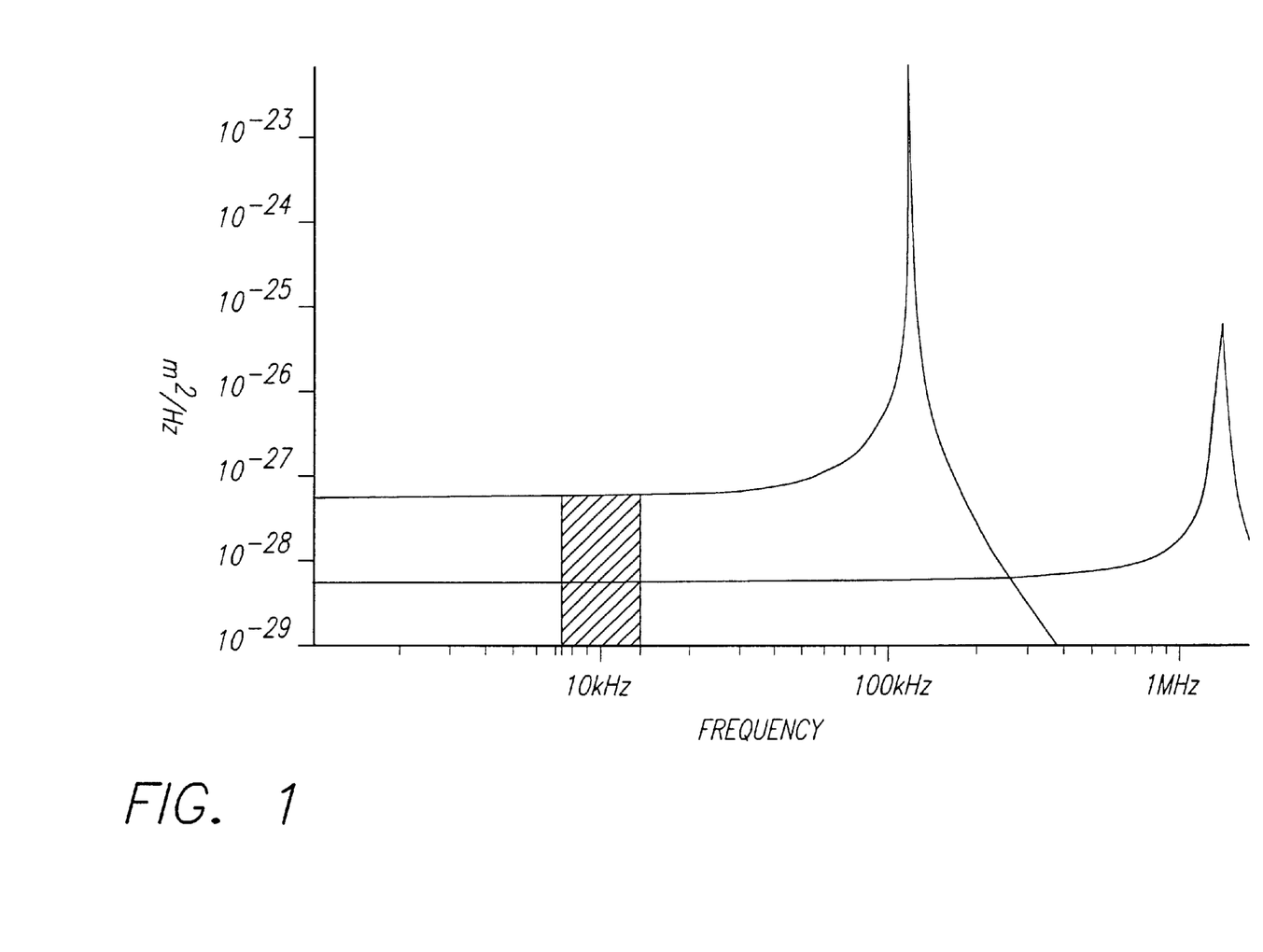
FIG. 1 is a plot of the calculated thermal power spectral densities for two cantilevers having the same spring constants and damping factors but different resonant frequencies.

Reducing the dimensions of a cantilever makes it possible to increase the resonant frequency while maintaining a low spring constant. This causes the fixed amount of thermal noise to be spread over a larger frequency range. Hence, in a given imaging bandwidth, there will be less thermal noise. FIG. 1 shows the calculated thermal power spectra densities for two cantilevers (modelled as simple harmonic oscillators) having the same spring constant (k=0.1 N/m) and damping factors (arbitrary) but different resonant frequencies. The square root of the total area under each curve is equal to the root-mean-square (RMS) of the thermal motion for each cantilever. As predicted by the equipartition theorem, the total RMS motion depends only on the spring constant and hence is the same for both cantilevers. However, in a given bandwidth below the resonant frequencies of both cantilevers, the cantilever with the higher resonant frequency has less RMS motion. Therefore, one can minimize the effects of thermal motion by increasing the cantilever resonant frequency.

Another advantage of increasing the cantilever resonant frequency is increased imaging speed. For example, to obtain good tapping mode images, it is desirable to let the cantilever tap roughly five times per pixel. This condition allows the cantilever to oscillate to equilibrium with the sample. Furthermore, it ensures that the RMS-to-DC converter can adequately separate the tapping frequency from the pixel frequency. Therefore, cantilevers with higher resonant frequencies will allow for increased imaging speed. It should be noted that other imaging modes such as non-contact mode may also benefit from small cantilevers with increased imaging speed. Of course, there are other requirements for fast imaging such as faster feedback electronics.

Fabrication Requirements

A process for making small cantilevers must meet several basic requirements. First, the cantilevers must be reflective enough to be used with practical laser-based detection schemes such as optical beam deflection (OBD) or interferometry. This is a major concern for small cantilevers having thicknesses of 50 nm or less where many materials will be nearly transparent to visible light. Silicon cantilevers may actually have good enough reflectivity for use with OBD or interferometric deflection sensing methods, if the thickness of the cantilever is chosen to equal a quarter of the wavelength of the laser being used for detection. The reflectivity of a 50 nm thick silicon membrane illuminated with 670 nm laser light and immersed in water is approximately R=0.6. However, constraining the thickness of the cantilevers to a quarter of the wavelength would limit the allowable combinations of spring constants and resonant frequencies. One could coat a silicon cantilever with metal to increase its reflectivity, but this would have the undesirable effect of creating a temperature sensitive "bimaterial" strip. Purely metallic cantilevers overcome both of these difficulties.

Figure 2:
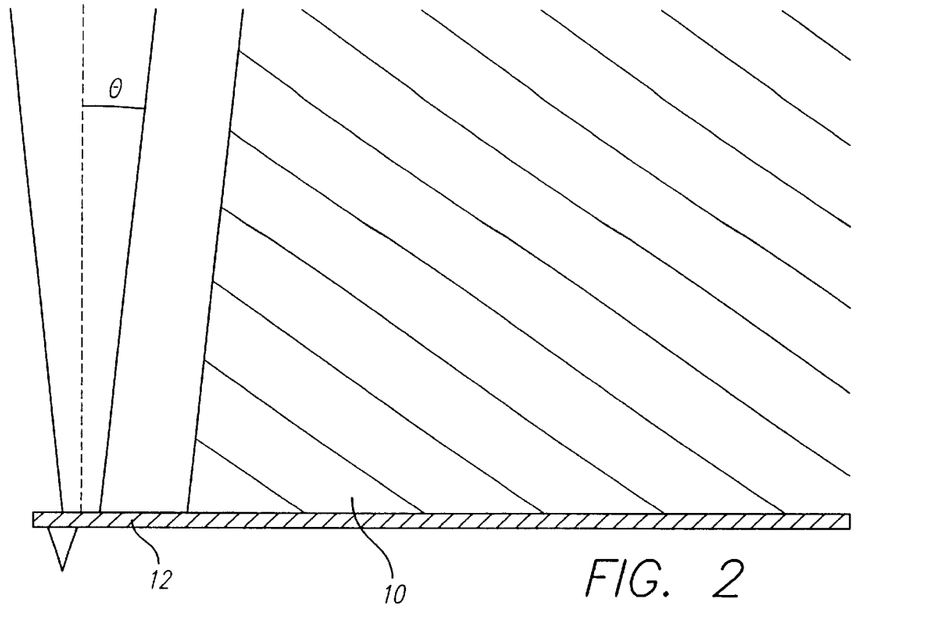
FIG. 2 is a schematic cross-sectional view of a chip-cantilever assembly made in accordance with this invention.

Two other considerations for making small cantilevers are geometrical in nature. First, there must be clearance for OBD detection of the cantilever motion. High numerical aperture optics must be used with small cantilevers in order to obtain spot sizes that are smaller than the dimensions of the cantilevers. Therefore, the non-cantilever side of the chip which supports the cantilevers must be recessed from the base of the cantilever in order to not block the incident and reflected laser light. This is illustrated schematically in FIG. 2. For example, in order to obtain a spot size of 2 $\mu$m with a 670 nm laser, the chip 10 supporting the cantilever 12 should be recessed by 12°. Similar arguments can be made about clearance issues in fiber-based interferometric detection schemes. In this case, there must be clearance for an optical fiber to be positioned so that there is a small working gap between the end of the fiber and the cantilever 12, thereby maximizing the interferometric signal modulation.

Figure 3A:
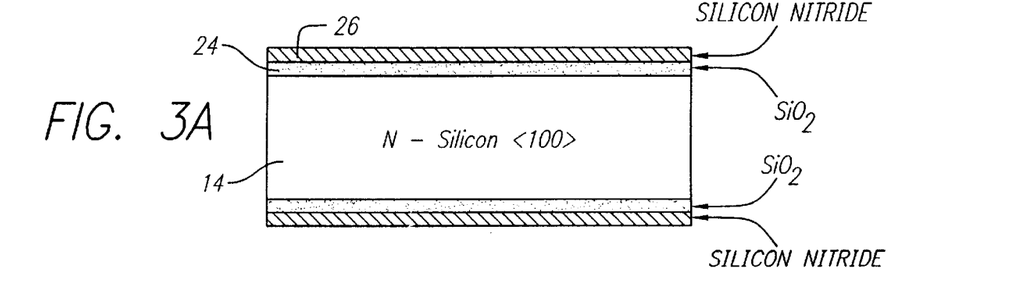
FIGS. 3A–E show various steps in a process of this invention to make a metal cantilever utilizing a sacrificial cantilever.
Figure 3B:
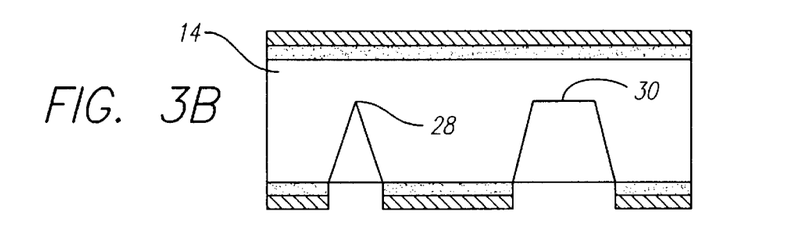
Figure 3C:
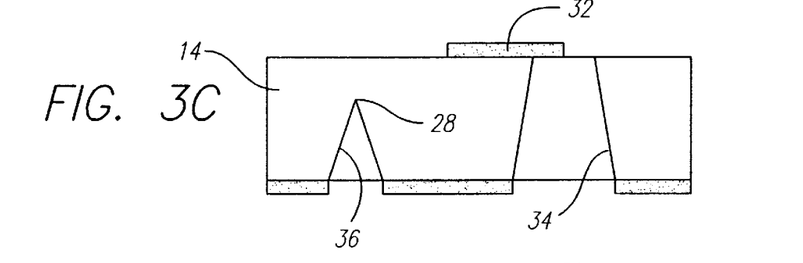
Figure 3D:
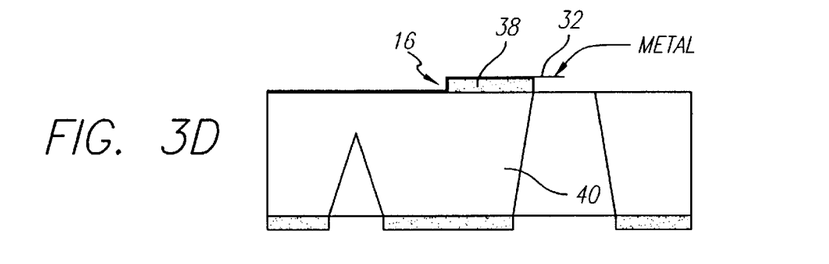
Figure 3E:
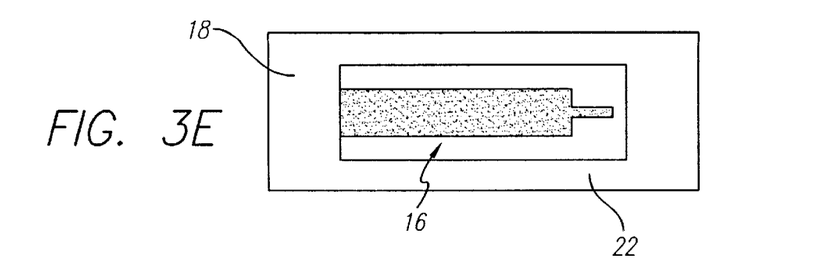
Figure 4:
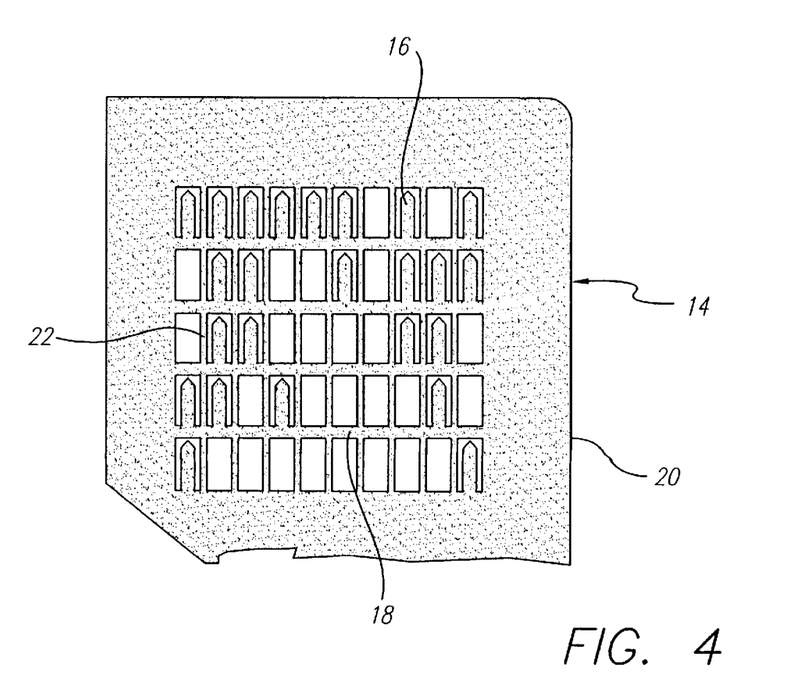
FIG. 4 shows a plan view of an array of chip-cantilever sets.

Referring to FIGS. 3A through E and FIG. 4, a process is shown which has been implemented to make metal cantilevers with silicon dioxide ($SiO_2$) cantilevers serving as the sacrificial cantilever. FIGS. 3A–D are schematic side views and FIG. 3E is a top view of a portion of the wafer 14 from which cantilever-chip sets 16 are formed. The process will be described with respect to the production of a single cantilever, but in practice the process is conducted on a wafer 14 which is sufficiently large to accommodate an array of cantilevers. Such an array of 50 cantilever-chip sets 16 is shown at FIG. 4 wherein about half of the cantilever-chip sets 16 have been removed from their supports. Such supports can be bars 18 (see also FIG. 3E) or the frame 20 around the array. Each chip-set 16 is also enclosed, before removal, by side bars 22 (again, see FIG. 3E).

The wafer 14 is a double-sided, polished, 300 $\mu$m, <100> oriented, single crystal silicon wafer. Referring to FIG. 3A, a thin layer 24 of $SiO_2$ is thermally grown on both sides of the wafer 14, and coated with low pressure chemical vapor deposited silicon nitride 26. Referring to FIG. 3B, a deep etch pattern is defined at the bottom side of the wafer by a standard photolithographic process, using a standard masking technique. The pattern serves to define the array of chips, shown as part of the array of chip-set 16 in FIG. 4. Each chip is held in the frame 20 or its crossbars with a single silicon tab 28 at the back of each chip.

More particularly, photolithography is used to pattern photoresist on the non-cantilever side (in the orientation of the figures) of the wafer 14 to define the region of the tab 28 as well as a cantilever access region 30. After the photolithography is complete, the bottom side silicon nitride layer 26 is etched using reactive ion or plasma etching. The $SiO_2$ layer 24 is then etched in buffered hydrofluoric acid. After these steps, the photoresist is stripped and the silicon is etched in KOH, e.g. 25% KOH. The silicon nitride layer serves the purpose of protecting the $SiO_2$ from thinning during the long KOH etch. The KOH etch is a deep etch which anisotropically etches the silicon wafer 14 to a thickness of about 10–15 $\mu$m to define the tab 28 and cantilever access region 30. The depth of the v-groove defining the tab 28 is a function of the mask opening because KOH is an anisotropic etchant for silicon and will etch exposed (III) planes at a much slower rate. The concentration of KOH to be used is empirically determined.

The silicon nitride having served its passivating purpose, is now removed with hot phosphoric acid ($H_3PO_4$). The cantilever side of the wafer is then coated with photoresist and photolithography patterned to define an $SiO_2$ cantilever 32 (FIG. 3C) to be used as the sacrificial cantilever template in subsequent steps. A two-sided infrared aligner is then used to expose the cantilever pattern aligned to the bottom side. The cantilever is then defined by etching the $SiO_2$ using reactive ion or plasma etching, but wet etching with buffered hydrofluoric acid could, alternatively, be used. The photoresist is then removed and a thin layer of plasma-enhanced chemical vapor silicon nitride is deposited onto the cantilever side of the wafer 14 to passivate the exposed silicon (on the cantilever side of the water). The sacrificial $SiO_2$ cantilevers are then released by etching the remaining 10–15 $\mu$m of silicon in KOH, and by removing the plasma-enhanced chemical vapor deposited silicon nitride with hot $H_3PO_4$ to yield the structure shown in FIG. 3C. Because the KOH will not significantly etch exposed (III) crystal planes, it is possible to release the sacrificial cantilever 32 while retaining the tab 28 by having the pattern that defines the etch cavity 34 beneath the sacrificial $SiO_2$ cantilever 32 substantially wider than the etch cavity 36 defining the silicon tab 28. Again, empirical experimentation quickly reveals how long to maintain the wafers in the KOH to obtain the desired release.

It should also be noted that with variations in the processing steps described above, sacrificial cantilevers could alternatively be made out of polycrystalline silicon, single crystal silicon, or silicon nitride.

Having fabricated the sacrificial cantilevers in the wafer array, the next step is to deposit the metal which will be used to form the final cantilever. The metal can be deposited by any metalization process, for example by sputtering. Depending on the choice of material used for the sacrificial cantilevers and the preferred method of release, there are certain chemistries which provide the necessary selectivity to release the metal cantilevers. For example, in the case of aluminum cantilevers, there are two different ways they could be released. If aluminum is deposited onto $SiO_2$ cantilevers, a wet etchant (such as "Pad" etch which consists of 13.5% NH4F, 31.8% acetic acid, 4.2% ethyleneglycole, and water) can be used to selectively remove the sacrificial $SiO_2$. However, if a dry release is preferred, the aluminum could be deposited onto silicon cantilevers, in which case $XeF_2$ can be used to selectively remove the silicon. Other material and chemical systems could be used to selectively remove the sacrificial layer via dry (e.g., reactive ion etching) or wet etching while not attacking the deposited final cantilever layer. Choices of material are easily made by those who are skilled in thin film processing techniques and etch chemistries.

After metalization, e.g., with gold, the sacrificial cantilever 32 is removed by etching, thereby releasing the metal cantilever 42. The result is shown in FIG. 3D. Please note that a residual non-cantilever side film 38 of $SiO_2$, less than 1 $\mu$m thickness, remains. The $SiO_2$ film remains because it is sandwiched between the metal layer and the chip. Since the metal layer is deposited onto the entire chip, not just the cantilever, the only place the $SiO_2$ is exposed to the etchant is the sacrificial cantilever hanging off the end of the chip. The result, as shown in FIG. 3D, is a chip 40 carrying a metallic cantilever 42. A top view of the cantilever-chip assembly 16 is shown in FIG. 3E.

Among the factors to be considered in the choice of metal and its deposition process is the residual stress of the deposited metal which is dependent on a variety of variables including the method of deposition (evaporating, sputtering, electroplating), the deposition parameters (pressure, temperature), and the materials involved. However, determining the nature and approximate magnitude of any residual stress is easily done by inspecting the bending of the initially straight sacrificial cantilevers after the metal deposition has taken place. This provides a simple way to characterize stress as a function of the deposition parameters for a given technique. These parameters can then be adjusted empirically to reach a deposition protocol that avoids any significant stress.

Figure 5:
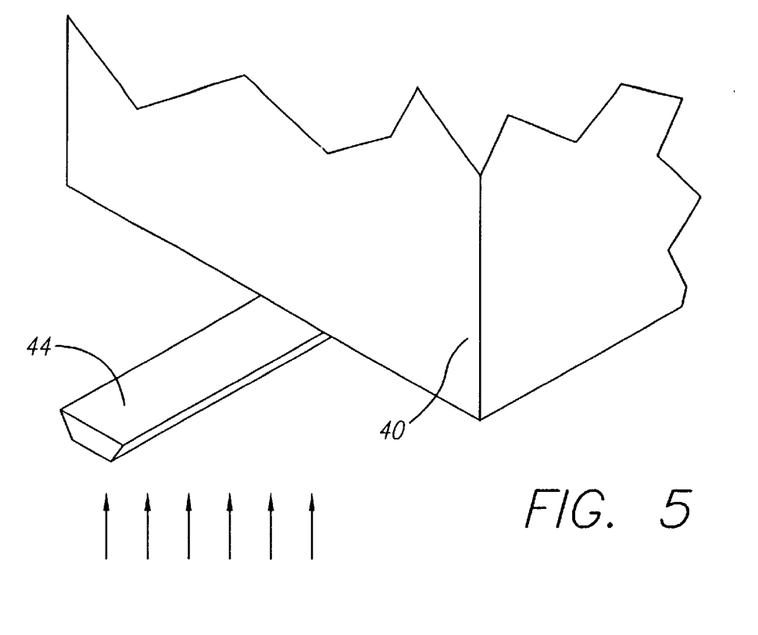
FIG. 5 illustrates an embodiment of the invention in which a sacrificial cantilever is formed with angled sidewalls.

Referring to FIG. 5, there is illustrated a sacrificial $SiO_2$ cantilever 44 that is made by sputtering a metal, such as nickel, from the non-cantilever side of the wafer, such as through the release opening 34 (FIG. 3C) onto a $SiO_2$ cantilever which was defined by a buffered oxide etch. Because the buffered oxide etch is an isotropic etch, the sidewalls will not be vertical and therefore when the nickel is sputtered from the non-cantilever side of the wafer, the metal cantilever will take on the shape of the sacrificial $SiO_2$ cantilever. This provides a means for fabricating cantilevers with specific 3-dimensional shapes as opposed to planar cantilevers.

Figure 6:
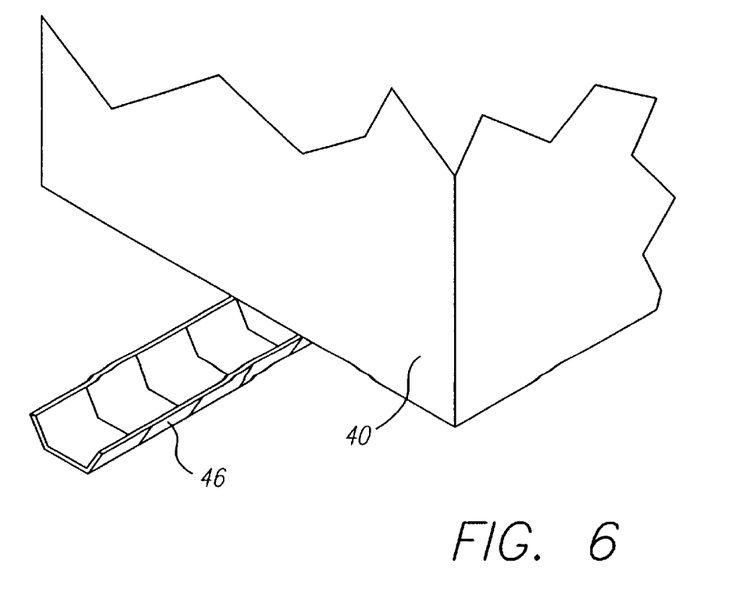
FIG. 6 illustrates a shaped metallic cantilever obtained by using the sacrificial cantilever of FIG. 5.

FIG. 6 illustrates the finally released trough shaped metallic cantilever 46.

Figure 7:
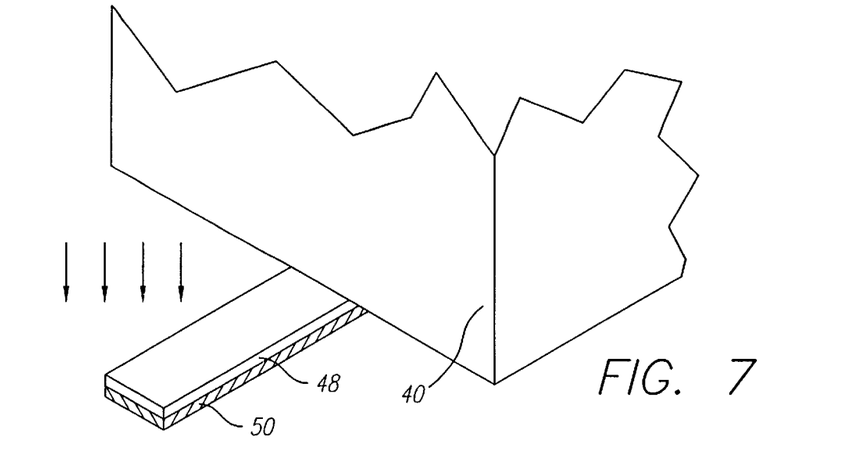
FIG. 7 illustrates another embodiment of the invention in which a metallic layer is deposited onto the cantilevered side of the wafer and then subjected to ion milling in which the ions are directed from the non-cantilevered side of the wafer, with the net result that any sidewall coverage of the sacrificial cantilever will be removed by the directed ions while the metallic layer will be protected by the sacrificial cantilever.
Figure 7A:
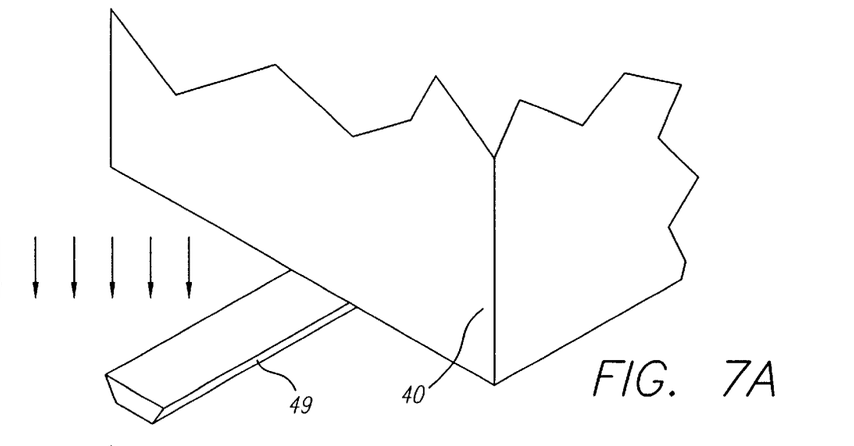
FIG. 7a illustrates another embodiment in which the metallic layer is deposited from the non-cantilevered side of the wafer onto sacrificial silicon dioxide cantilevers which have been defined using an isotropic etch thereby eliminating sidewall coverage of the sacrificial cantilevers.

Other structures such as silicon cantilevers can be anisotropically etched in KOH to produce well defined shapes. However, if planar cantilevers are designed, sidewall coverage of the sacrificial cantilevers can be avoided. For example, one can define the sacrificial cantilevers via a highly anisotropic dry etch so that the sidewalls 48 and 50 are nearly vertical; consequently, the sidewall coverage will be minimized. In the case of metal sputtering, there will still be some sidewall coverage, but this can be removed by ion milling from the cantilever side of the wafer prior to the final release (see FIG. 7). Referring to FIG. 7a, another approach would be to deposit the metallic layer from the non-cantilevered side of the wafer onto a sacrificial silicon dioxide cantilever 49 which has been defined using an isotropic etch such as buffered HF thereby eliminating sidewall coverage of the sacrificial cantilevers.

Figure 8:
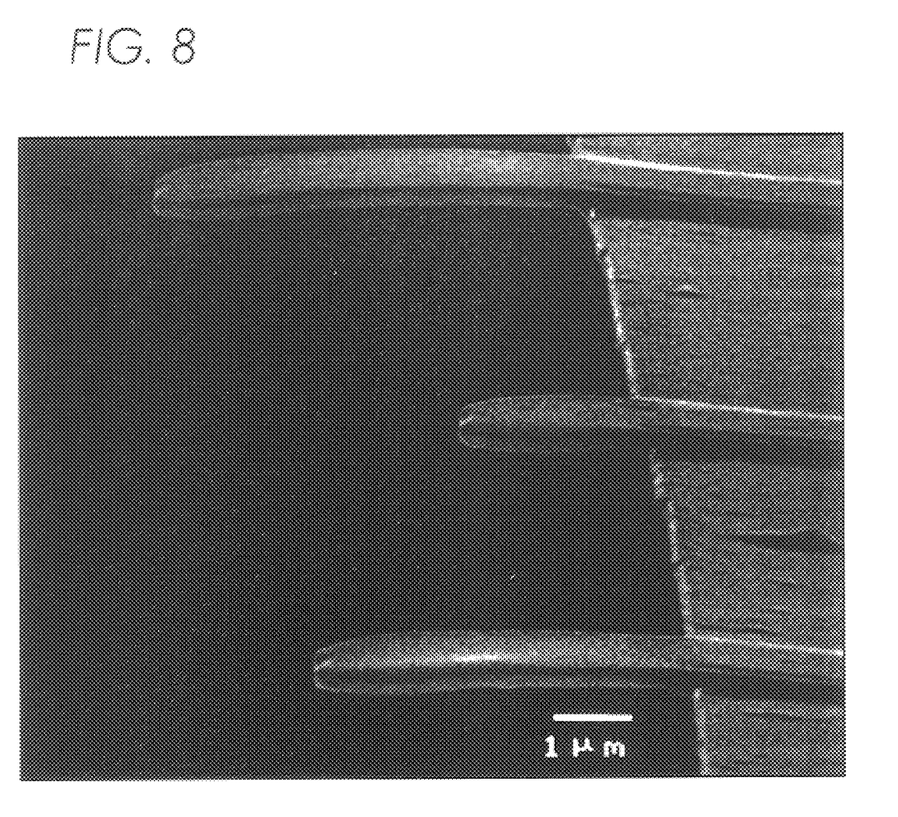
FIG. 8 shows a group of cantilevers made in accordance with the invention.

We have used the above process for fabricating silver, nickel, and 14-karat gold cantilevers. The silver cantilevers were released from sacrificial $SiO_2$ cantilevers by both wet (buffered oxide etch) and dry etching ($CF_4/O_2$). The 14-karat gold cantilevers were released by wet etching with buffered oxide etch. FIG. 8 shows a group of 14-karat gold cantilevers which were made by sputtering a very thin layer (<15 nm) of intermediate metal, in a particular embodiment, titanium, followed by a thicker layer ("about" 70 nm) of 14-karat gold onto reactive ion etching defined $SiO_2$ cantilevers, from the cantilever side of the chip, and subsequently removing the $SiO_2$ and titanium with buffered oxide etch. The dimensions of the pictured cantilevers are nominally 3–7 µm long, 3 µm wide, and 70 nm thick. These cantilevers appear to be thicker than 70 nm because of sidewall coverage. The titanium helps to both create better adhesion between these $SiO_2$ and the gold, and to relieve stress between the $SiO_2$ and the gold layers. If the titanium layer is not deposited prior to gold deposition, 14-karat gold deposition onto released $SiO_2$ cantilevers can result in bent gold cantilevers.

We have also formed short aluminum cantilevers by depositing a thin aluminum layer on unmetalized commercial silicon nitride cantilevers which have an anodically bonded pyrex substrate. The cantilever side of the original silicon nitride cantilevers served the purpose as the "sacrificial cantilever", and was coated with a 100 nm aluminum layer. Subsequently, the aluminum coated cantilevers were loaded onto a fixture, aluminum layer down, uncoated silicon nitride side face-up. The fixture was placed inside the chamber of a reactive ion etcher and the silicon nitride was reactive ion etched to completely expose a solid 100 nm thick aluminum cantilever. A fluorine chemistry plasma was used to selectively remove the silicon nitride sacrificial cantilever. $CF_4$-based chemistry was used in this particular instance, although $CF_4/O_2$, $SF_6/O_2$, or similar chemistries which do not attack the aluminum cantilever can be employed. Varieties of chlorine based plasmas, however, may not be desirable with aluminum levers formed in this manner, since some chlorine chemistry plasmas would readily attack the aluminum layer.

Accuracy of the above process can be limited by the ability to accurately measure the etched depth as well as non-uniformities of the wafer thickness or etch rate across the wafer. These limitations can affect the cantilever length which is controlled by offsetting the cantilever pattern from the intersection of the exposed (111) plane with the bottom of the etch pit by an amount dependent on the depth of the initial deep etch. Thus, it may be difficult to control the length of the cantilever better than ±4 µm. One way to get around this is to include an array of cantilevers with different lengths so that at the end of the process, the user simply picks the cantilever that has the desired length. Such an array is illustrated in FIG. 8, discussed above.

Figure 9:
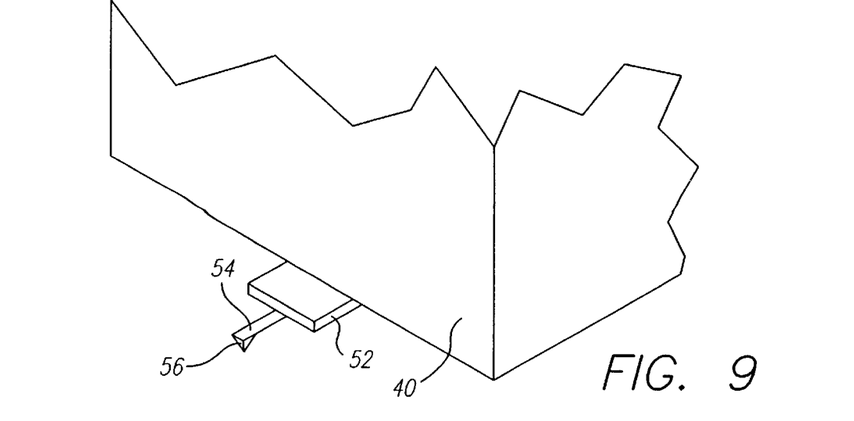
FIG. 9 shows the formation of a platform to carry the cantilever on the underside of the chip, in accordance with another embodiment of the invention.

Another approach is illustrated in FIG. 9 wherein a platform 52 is formed whose position is defined lithographically on the same side of the wafer as the cantilever 54. The platform 52 not only allows for better control of cantilever length, but it also gives better optical and mechanical clearance. A method to accomplish this is to use the p+ (boron) etch stop property of the anisotropic wet silicon enchants such as KOH, EDP, etc. A heavily doped boron platform containing more than $2 \times 10^{19}/cm^3$ boron, is realized by diffusion or ion implantation for this purpose. One or more sacrificial cantilevers are defined on top of this platform. Since heavily boron-doped silicon is not rapidly etched with anisotropic enchants, the uncertainty in the cantilever lengths due to etching selectivity between <100> and <111> planes, wafer thickness and over etching is eliminated. The length of the cantilevers is then dependent only on the ability to align the mask relative to the boron-doped regions, which with the present day mask aligners can be controlled within ± one micrometer.

A tip 56 can be placed on the metallic cantilever by any known method, such as by adhesion, or by electron beam deposition. See: Kirsten Ingolf Schiffmann, supra.

Figure 10A:
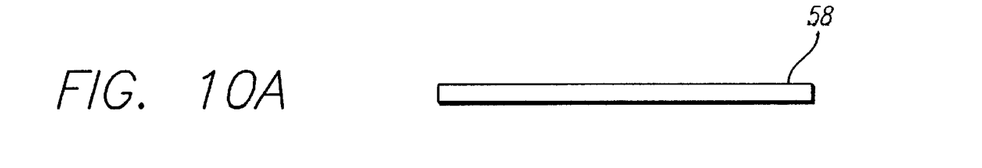
FIGS. 10A–F show a process in which a series of patterned depositions are built up, in accordance with still another embodiment of the invention.
Figure 10B:
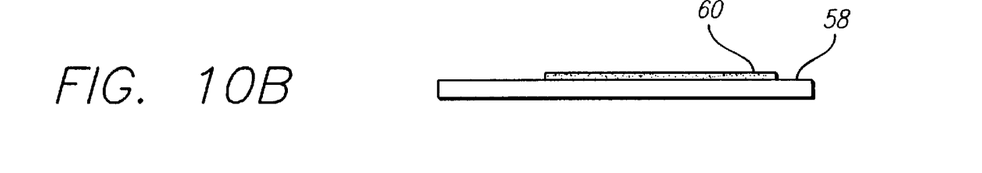
Figure 10C:
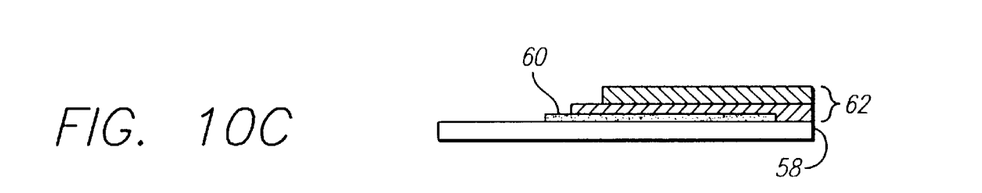
Figure 10D:
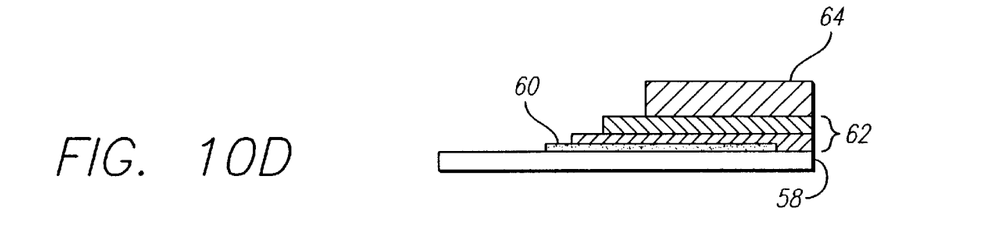

In another embodiment of the invention, the final cantilever, and extension platform are obtained using a series of patterned depositions built up on a supporting substrate, again using a sacrificial cantilever substrate. For example, this could be accomplished by combinations of plating, sputtering, and/or evaporation to build a substrate, cantilever extension platform and small cantilever in a composite structure similar to Rasmussen, et al., and Mamin, et al., cited supra. In contrast to the work by these two groups, in accordance with this embodiment, a stepped platform (for optical and mechanical clearance and a chip to make it easier to handle the cantilevers) are obtained in a series of plating steps which are stenciled with thick resist. Referring to FIGS. 10A through F, one starts with a substrate such as a silicon wafer 58 (FIG. 10A), deposits a metallic pattern cantilever structure 60 on the wafer 58 (FIG. 10B), then using two or more thick resist/plating steps, a stepped platform 62 is patterned (FIG. 10C). Thereafter, a thick resist is plated thereon to pattern a chip 64 (FIG. 10D). The substrate 58 is then etched away to yield the chip-cantilever assembly 66 (FIG. 10E), a top view being shown in FIG. 10F.

Figure 10E:
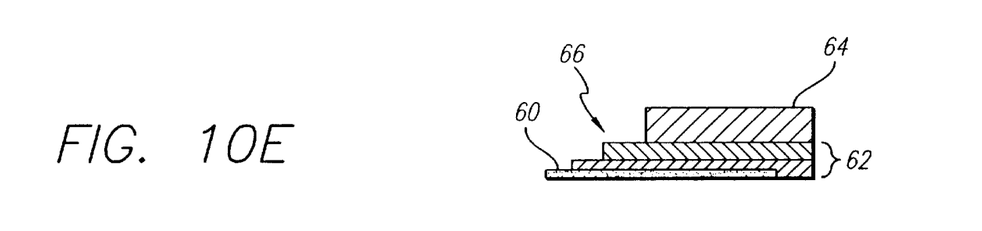
Figure 10F:
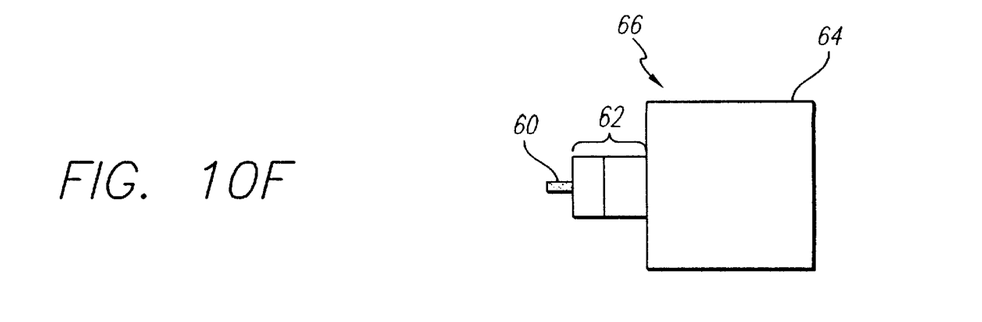

It is desirable that there be clearance between the cantilever and the corner of the chip 64 which is supporting it such as at 60 in FIG. 10E and as shown in FIG. 9. Although clearance is commonly used in commercially available cantilevers (such as silicon cantilevers made by Nanosensors GmbH), it is particularly useful for small cantilevers where crashing the chip corners would be a problem for small misalignments <1 degree> between the sample and cantilever chip.

We claim:

1. A method for fabricating at least one cantilever for an atomic force microscope formed of a first material, comprising:

forming a structure integral with a chip having an outer surface, at least a portion thereof being in the desired shape of said cantilever and serving as a sacrificial template for said cantilever, said template and chip being formed of a material different from said first material;

depositing said first material on said template; and removing said template without removing said first material, whereby to yield a cantilever of said first material having said desired shape.

2. The method of claim 1 in which said cantilever is formed of metal.

3. The method of claim 1 in which the material of said structure is selected from silicon dioxide, silicon nitride, and silicon.

4. The method of claim 1 in which said template has a planar outer surface whereby to yield a planar cantilever.

5. The method of claim 1 wherein said template has a length dimension projecting from said chip and has a non-planar outer surface whereby to yield a cantilever that is non-planar along a plane normal to said length direction.

6. A method for fabricating at least one metallic cantilever, comprising:

forming a structure having an outer surface, at least a portion thereof being in the desired shape of said metallic cantilever, said structure being formed of a material selected from silicon dioxide, silicon nitride, and silicon, said structure being integral with a silicon chip;

depositing said metal on said structure; and removing said structure without removing said metal, whereby to yield a chip-metallic cantilever assembly.

7. The method of claim 6 in which a portion of said structure has a planar outer surface whereby to yield a planar cantilever.

8. The method of claim 6 including relieving stress between the material of said structure and the metal deposited thereon.

9. The method of claim 8 in which a layer of intermediate metal is deposited on said structure prior to depositing the metal constituting the cantilever, said intermediate metal being removed with said structure.

10. The method of claim 9 in which said intermediate metal is titanium and the material of said structure is silicon dioxide.

11. A method for fabricating at least one cantilever for an atomic force microscope formed of a metallic material, comprising:

forming a structure having an outer surface larger in its dimensions than the dimensions of the desired shape of said cantilever;

depositing said metallic material on said structure;

depositing at least one platform on at least a portion of said first material whereby the desired cantilever shape is not covered by said platform; and removing said structure without removing said metallic material, whereby to yield said cantilever.

12. A metallic cantilever for an atomic force microscope supported on a chip, said cantilever having a length of 10 μm or less, a width of 4 μm or less; and a thickness of 70 nm or less.

13. The metallic cantilever of claim 12 having a length of 4–10 μm, a width of 2–4 μm, and a thickness of 50–70 nm.

14. The metallic cantilever of claim 12 having a planar shape.

15. The metallic cantilever of claim 12 having a nonplanar shape.

16. A metallic cantilever for an atomic force microscope supported on a chip and a platform on said cantilever integral therewith covering only a portion of said cantilever whereby the portion of said cantilever not covered by said platform has a length of 10 μm or less.

17. The cantilever of claim 16 in which the portion of said cantilever not covered by said platform has a width of 4 μm or less and a thickness of 70 nm or less.

18. A method for fabricating at least one cantilever for an atomic force microscope formed of a first material, comprising:

forming a structure having an outer surface, at least a portion thereof being in the desired shape of said cantilever, said structure being formed of a material different from said first material and including a platform integral with a chip;

depositing said first material on said structure; and removing said structure without removing said first material, whereby to yield said cantilever.

19. A method for fabricating at least one metallic cantilever, comprising:

forming a structure having an outer surface, at least a portion thereof being nonplanar and in the desired shape of said metallic cantilever, said structure being formed of a material selected from silicon dioxide, silicon nitride, and silicon, said structure being integral with a silicon chip;

depositing said metal on said structure; and removing said structure without removing said metal, whereby to yield a chip-metallic cantilever assembly in which said cantilever is nonplanar.

20. A method for fabricating at least one cantilever for an atomic force microscope formed of a first material, comprising:

forming a structure having an outer surface, at least a portion thereof being in the desired shape of said cantilever, said structure being formed of a material different from said first material and including a platform integral with a chip;

depositing said first material on said structure; and removing said structure using an etchant therefor without removing said first material, said platform being formed of silicon sufficiently doped with boron to limit etching by said etchant, whereby to yield said cantilever.

* * * * *